S. C. ANKER-HOLTH.
YIELDING BEARING.
APPLICATION FILED DEC. 9, 1907.

936,753.

Patented Oct. 12, 1909.

WITNESSES:
James A. Beckwith
Nellie E. George

INVENTOR
Severin C. Anker-Holth
BY Harry Irwin Cromer
ATTORNEY.

UNITED STATES PATENT OFFICE.

SEVERIN C. ANKER-HOLTH, OF RIVERSIDE, ILLINOIS.

YIELDING BEARING.

936,753.  Specification of Letters Patent.  Patented Oct. 12, 1909.

Application filed December 9, 1907.  Serial No. 405,819.

*To all whom it may concern:*

Be it known that I, SEVERIN C. ANKER-HOLTH, a citizen of the United States, residing in Riverside, in the county of Cook and State of Illinois, have invented certain new and useful Improvements in Yielding Bearings, of which the following is a specification.

This invention relates to that class of bearings, having a stationary member, a movably mounted bushing, a spring in engagement with the bushing or with a member supported by the bushing, and means for holding the spring at a tension and adapted to permit the transverse movement of the bushing and the transverse movement of both ends of the spring with the bushing and with relation to the stationary member.

The principal object of the invention is to provide a simple, economical and efficient flexible or compensating bearing for cream separators.

Further objects are to provide a flexible or compensating bearing having a stationary member and a movable journal bearing or bushing, with a spring and a movable resistant, collar or sleeve all so constructed and arranged as to permit both ends of the spring to move transversely with the bushing and remain substantially concentric with the bushing during the transverse movements of both of said parts and during the compression and expansion of the spring and thereby enable the spring to yieldingly resist the transverse movements of the bushing and spindle and support them in proper operative position with the highest possible degree of accuracy and efficiency; to provide a bearing all parts of which are adapted to be readily assembled, and which consists of the smallest possible number of parts consistent with efficiency, and so constructed as to be readily and accurately centered.

Other and further objects of the invention will appear from an examination of the drawings and the description and claims.

The invention consists in the features, combinations and details of construction hereinafter described and claimed.

Figure 1:
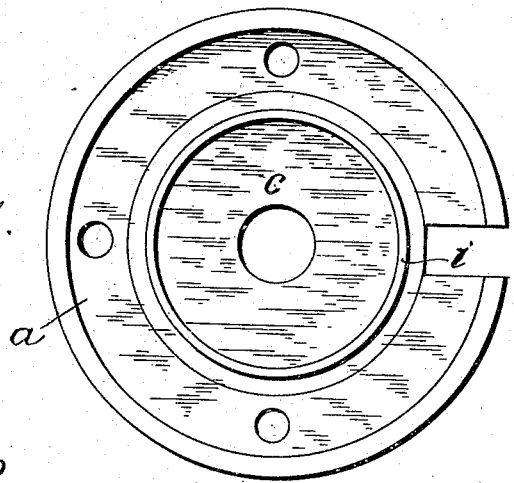
Figure 2:
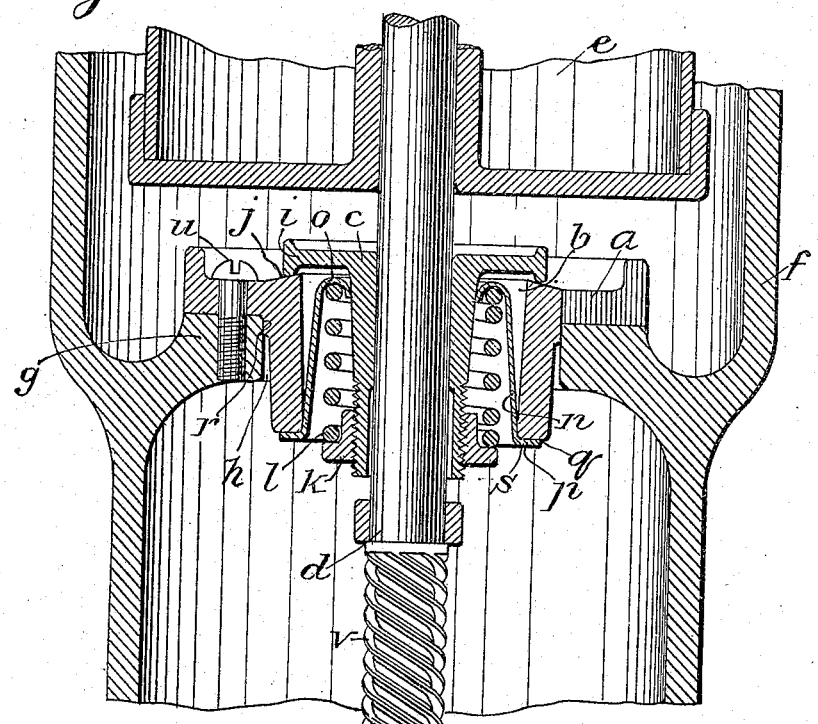

In the accompanying drawing, Figure 1 is a plan view of a bearing constructed in accordance with my improvements, and Fig. 2 a central sectional elevation of the same, in operative position in a cream separator.

In constructing a flexible or compensating bearing for cream separators, in accordance with my improvements, I provide a fixed or stationary outer member $a$ having a central opening $b$ into or through which extends a central bushing or journal bearing $c$. The bushing has a vertical central opening through which extends the spindle $d$ having a bowl $e$ mounted thereon and adapted to be held yieldingly in operative position in the casing $f$, by means of the bearing. The bowl casing has a diaphragm or horizontally disposed wall $g$ provided with a circular central opening $h$ through which the lower or inner portion of the stationary member $a$ of the bearing extends. The bushing $c$ has a laterally projecting flange portion $i$ which rests upon and in sliding engagement with the upper convex surface $j$ of the stationary member $a$. The lower portion of the bushing is also provided with a laterally projecting portion or member $k$ preferably in the form of a nut in threaded engagement with the main body portion of the bushing and adapted to be adjusted up or down upon the bushing proper, for regulating the tension and supporting the bottom end of the spring $l$ which encircles the bushing. A preferably annular centering member or metallic sleeve $n$ encircles the spring and bushing and is provided with an inwardly extending annular flange $o$ at its upper end in engagement with the bushing and also in engagement with and forming a movable resistant for the upper end of the spring $l$. The lower lateral flange or nut portion of the bushing forms a movable support and resistance for the opposite end of the spring, as already suggested, so that both ends of the spring, and in fact the entire spring is adapted to move freely transversely with the bushing and with the gyrating spindle and bushing, and with relation to the stationary member $a$. This sleeve has a lateral bottom flange $p$ extending below and held yieldingly in engagement with the bottom $q$.

The outer rigid or fixed member $a$ above described, is provided with an outer circular surface portion at the point indicated by the reference letter $r$, which surface portion is adapted to center the fixed member and insure its being held in proper central operative position in the bowl casing or framework of the cream separator. Said fixed member is also provided with an inner circular or cylindrical surface portion at the point indicated by the reference letter $s$ for centering and holding in position the sleeve $n$, the lower portion of said sleeve being in movable engagement with said rigid member, as shown.

The surface portions at the points indicated by the reference letters $j$, $r$, and $s$, are thus all on one integral piece and are therefore in permanent fixed relation to each other. They are all so disposed that they can be turned upon the same center or without removal or disturbing the center of rotation of the piece in the lathe while said surfaces are being turned. The result is that a higher degree of accuracy of centering of the parts is thus obtained than is possible where any two or more of these surfaces, or surfaces corresponding thereto, are on different pieces, or where threaded surfaces or parts are interposed between them. The advantages thus obtained will be readily apparent to those skilled in the art. Worn parts can be removed and new parts substituted therefor without injuriously affecting the centering of the parts, and by persons having no special skill or mechanical knowledge. The parts are adapted to drain themselves while in upright operative position. The tension of the spring may be readily adjusted even while the device is in operation, and the proper centering of the spindle as well as of the bearing parts is rendered certain.

The fixed member is secured in position by bolts $u$, and the spindle is provided with a worm $v$ by means of which it is adapted to be connected with suitable driving mechanism of any known or desired type.

The bottom end of the spindle is provided with a suitable bearing $w$ which should permit the upper portion of the spindle and the bowl to have all of the freedom of movement permitted by the flexible bearing above described. It will therefore be seen that the proper centering of the spindle and bowl during the exceedingly rapid revolutions thereof when in operation, is accomplished automatically by the bearing above described, in such a manner as to reduce the friction to a minimum. The upper end of the spring is engaged only by the transversely movable upper end of the centering sleeve which forms a movable resistant for that end of the spring. The lower end of the spring is engaged only by the lower end or nut portion of the bushing which forms a movable resistant and support for the spring at that end. So that both ends of the spring are engaged by movable resistants only and are permitted to move transversely with the bushing and remain at all times in substantially concentric relation to the bushing and spindle during the gyrations of the spindle. The yielding resistance to the transverse movements of the spindle and bowl is thus produced by a spring all parts of which have a substantially constant transverse relation to the bushing and spindle during their gyratory movements. It will therefore be seen that this resistance is produced almost entirely if not wholly by the longitudinal compression and expansion of all parts of the spring and not by the mere lateral bending toward one side or the other of successive and different parts of the spring. A tension can thus be preserved which increases and decreases with great accuracy and uniformity, the desirability and importance of which will be readily understood by those skilled in the art.

I claim:—

1. In a flexible bearing, the combination of a stationary member, a bushing movably mounted and having a laterally projecting flange portion in sliding engagement with the stationary member, a spring supported by the bushing, and a centering member encircling the spring and having one end in contact with the stationary member and out of contact with the spring and bushing, the opposite end of said centering member being in contact with the spring and bushing and out of contact and movable transversely with relation to the stationary member.

2. In a flexible bearing, the combination of a stationary member, a bushing movably mounted and having a laterally projecting upper portion in engagement with the stationary member and movable with relation thereto, a spring operatively connected with the bushing, and a movable ring having one end in engagement with the spring and out of engagement with the stationary member, and having its opposite end out of engagement with the bushing and spring and in engagement with the said stationary member.

3. In a flexible bearing, the combination of a stationary member, a bushing movably mounted and having a laterally projecting flange portion in sliding engagement with the stationary member, a spring encircling the bushing, a centering ring encircling the spring and having one end in contact with the stationary member and out of contact with the spring and bushing and having its opposite end in contact with the spring and out of contact and movable transversely with relation to the stationary member, and a nut mounted upon the bushing in supporting engagement with the spring and out of contact with the ring, for operatively connecting the spring and bushing and permitting the adjustment of the spring.

4. In a flexible bearing, the combination of a stationary member, a bushing movable transversely with relation to the stationary member and having a laterally projecting flange portion, a spring encircling the bushing and having both of its ends movable with the bushing transversely with relation to the stationary member, means for connecting one end of the spring with the bushing, and a ring having one end in engagement with the opposite end of the spring and out of engagement with the stationary member, the opposite end of said ring being in engagement with the stationary member and out of engagement with the spring and bushing, all adapted to permit the movement of both ends of the spring transversely with relation to the stationary member.

5. In a flexible bearing, the combination of a stationary member, a transversely movable bushing provided with a central opening and having a laterally projecting flange portion in sliding engagement with the stationary member, a spring encircling the bushing, a nut in threaded engagement with the bushing and out of engagement with the stationary member and forming a connection between one end of the spring and the bushing, and a ring having one end in engagement with the stationary member and its opposite end in engagement with the bushing and spring and out of engagement with the stationary member, both ends of the spring being held constantly substantially concentric with the bushing and movable transversely with relation to the stationary member, said stationary member having surface portions all formed on one integral piece in engagement with the flange portion of the bushing, the lower end of the ring, and a support upon which the stationary member is mounted, respectively.

SEVERIN C. ANKER-HOLTH.

Witnesses:
HARRY IRWIN CROMER,
NELLIE E. GEORGE.